United States Patent
Fu et al.

(10) Patent No.: US 7,237,608 B2
(45) Date of Patent: Jul. 3, 2007

(54) SELF DIVERTING MATRIX ACID

(75) Inventors: Diankui Fu, Missouri City, TX (US);
Mohan Panga, Houston, TX (US);
Slaheddine Kefi, Cottenham (GB);
Marieliz Garcia-Lopez de Victoria,
Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 279 days.

(21) Appl. No.: 10/969,110

(22) Filed: Oct. 20, 2004

(65) Prior Publication Data

US 2006/0081370 A1    Apr. 20, 2006

(51) Int. Cl.
*E21B 43/16* (2006.01)
*E21B 43/25* (2006.01)

(52) U.S. Cl. ............ 166/279; 166/307; 166/308.1

(58) Field of Classification Search .......... 166/279, 166/307, 308.1
See application file for complete search history.

(56) References Cited

U.S. PATENT DOCUMENTS

| | | | |
|---|---|---|---|
| 3,724,549 A | 4/1973 | Dill ................... 166/282 |
| 4,324,669 A | 4/1982 | Norman et al. ......... 252/8.55 |
| 4,591,447 A | 5/1986 | Kubala ................. 252/8.55 |
| 4,695,389 A | 9/1987 | Kubala ................ 252/8.553 |
| 4,807,703 A | 2/1989 | Jennings, Jr. ............ 166/307 |
| 5,979,557 A | 11/1999 | Card et al. ............. 166/300 |
| 6,035,936 A | 3/2000 | Whalen ................ 166/308 |
| 6,148,917 A | 11/2000 | Brookey et al. .......... 166/301 |
| 6,258,859 B1 | 7/2001 | Dahayanake et al. ....... 516/77 |
| 6,306,800 B1 | 10/2001 | Samuel et al. ........... 507/129 |
| 6,367,548 B1 | 4/2002 | Purvis et al. ............ 166/281 |
| 6,399,546 B1 | 6/2002 | Chang et al. ............ 507/240 |
| 6,435,277 B1 | 8/2002 | Qu et al. ............... 166/281 |
| 6,482,866 B1 | 11/2002 | Dahayanake et al. ...... 516/77 |
| 6,497,290 B1 | 12/2002 | Misselbrook et al. ..... 166/384 |
| 6,506,710 B1 | 1/2003 | Hoey et al. |
| 6,569,814 B1 | 5/2003 | Brady et al. ............ 507/201 |
| 6,605,570 B2 | 8/2003 | Miller et al. ............ 507/211 |
| 6,637,517 B2 | 10/2003 | Samuel et al. ........... 166/381 |
| 6,667,280 B2 | 12/2003 | Chang et al. ............ 507/240 |

(Continued)

FOREIGN PATENT DOCUMENTS

CA    1109356    9/1981

(Continued)

OTHER PUBLICATIONS

SPE 56529 Case Study of a Novel Acid-Diversion Technique in Carbonate Reservoirs. F.F.Chang, T.Love, C.J.Affeld, J.B.Blevins III, R.L.Thomas, and D.K.Fu, Feb. 1998.

(Continued)

*Primary Examiner*—David Bagnell
*Assistant Examiner*—Nicole A Coy
(74) *Attorney, Agent, or Firm*—Darla P. Fonseca; David Cate; Robin Nava

(57) ABSTRACT

A method is described for treating a subterranean formation with a low viscosity fluid system that contains a viscoelastic surfactant at a concentration too low to viscosify the fluid, but that is concentrated in the formation so that the fluid system gels. The fluid optionally contains a formation-dissolving agent. The fluid is used in matrix acidizing, acid fracturing, and diversion.

36 Claims, 1 Drawing Sheet

U.S. PATENT DOCUMENTS

| | | |
|---|---|---|
| 6,703,352 B2 | 3/2004 | Dahayanake et al. ........ 507/241 |
| 2002/0000464 A1 | 1/2002 | Nelson et al. ............... 507/200 |
| 2002/0023752 A1 | 2/2002 | Qu et al. ..................... 166/308 |
| 2002/0033260 A1 | 3/2002 | Lungwitz et al. ............ 166/278 |
| 2002/0147114 A1 | 10/2002 | Dobson, Sr. et al. ........ 507/242 |
| 2003/0040546 A1 | 2/2003 | Dahayanake et al. |
| 2003/0119680 A1 | 6/2003 | Chang et al. ................ 507/200 |
| 2003/0134751 A1 | 7/2003 | Lee et al. .................... 507/200 |
| 2003/0139298 A1 | 7/2003 | Fu et al. ..................... 507/200 |
| 2004/0005671 A1 | 1/2004 | Nash et al. |
| 2004/0009880 A1 | 1/2004 | Fu et al. ..................... 507/200 |
| 2004/0045710 A1 | 3/2004 | Fu et al. |
| 2004/0176478 A1 | 9/2004 | Dahayanake et al. ......... 516/77 |
| 2005/0067165 A1 | 3/2005 | Cawiezel et al. ............ 166/307 |
| 2005/0107265 A1 | 5/2005 | Sullivan et al. ............. 507/271 |
| 2005/0137095 A1* | 6/2005 | Cawiezel et al. ........... 507/240 |
| 2005/0155762 A1* | 7/2005 | Chen et al. ................. 166/281 |
| 2006/0042797 A1* | 3/2006 | Fredd et al. ................. 166/282 |

FOREIGN PATENT DOCUMENTS

| | | |
|---|---|---|
| GB | 2012837 | 8/1979 |
| GB | 2354541 | 8/2001 |
| GB | 2372058 | 8/2002 |
| WO | 01/29369 | 4/2001 |
| WO | 03/054352 | 7/2003 |
| WO | 03/093641 | 11/2003 |

OTHER PUBLICATIONS

SPE 80274—*Application of Novel Diversion Acidizing Techniques to Improve Gas Production in Heterogenous Formation.* By Xugang Wang, Honglan Zou, Jun Tian, Fuxiang Zhang, Xingsheng Cheng and Suzhen Li, Feb. 2003.

* cited by examiner

SELF DIVERTING MATRIX ACID

BACKGROUND OF THE INVENTION

This invention relates to an acidic fluid that increases in viscosity as it is pumped into a subterranean formation. More particularly, it relates to a fluid system—that contains a concentration of a viscoelastic surfactant that is initially insufficient to cause the fluid to gel—that gels as the fluid flows through a permeable subterranean formation. Most particularly it relates to a method of treating a subterranean formation with such a fluid system.

In many oilfield operations there are occasions when it is desirable to pump a low viscosity fluid that becomes more viscous after it has been injected into a borehole or into a formation. Initially, low viscosity might be desirable, for example, to reduce the hydraulic horsepower needed for pumping, to facilitate mixing procedures at the surface, or to decrease the resistance to flow of the fluid through the pores of a subterranean formation. Subsequently, higher viscosity might be desired for example to reduce the flow rate of the fluid through a porous formation or through fractured or lost-circulation zones, for example so that the fluid acts as a diverter. Currently, there are several types of acid systems that are designed to increase in viscosity, but the viscosity increases are dependent upon consumption of some or all of the acid. Some of these systems are polymer-based; polymers may damage formations. Other systems are based on viscoelastic surfactants (VES's) that are much cleaner; however, the existing VES systems require that the initial fluid contain sufficient surfactant to form a gel, and surfactants may be expensive. A fluid that is based on a low surfactant concentration and does not require acid consumption to gel would be desirable.

SUMMARY OF EMBODIMENTS OF THE INVENTION

One embodiment is a method of treating a subterranean formation penetrated by a wellbore including injecting a low-viscosity treatment fluid into the formation; the treatment fluid contains a viscoelastic surfactant system at a viscoelastic surfactant concentration insufficient for aggregation in the bulk fluid of viscoelastic surfactant structures into a viscosity-enhancing configuration. The viscoelastic surfactant in the treatment fluid aggregates in the formation and the treatment fluid becomes viscous. Another embodiment is a method of treating a subterranean formation penetrated by a wellbore with a viscous fluid comprising injecting into the formation a treatment fluid containing a viscoelastic surfactant system at a viscoelastic surfactant concentration insufficient for aggregation of viscoelastic surfactant structures into a viscosity-enhancing configuration, and allowing the viscoelastic surfactant system to concentrate in the formation so that aggregation and viscosification occur. The concentration of the viscoelastic surfactant system is typically between about 0.1 and about 10 percent, for example between about 0.25 and about 1 percent. The treatment fluid optionally further contains a formation-dissolving agent. Examples of the treatment method include matrix acidizing, acid fracturing, and diversion.

In one embodiment, the viscoelastic surfactant system contains a cationic surfactant, for example a cationic surfactant having the structure:

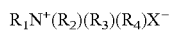

in which $R_1$ is a group that has from about 14 to about 26 carbon atoms and may be branched or straight chained, aromatic, saturated or unsaturated, and may include a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of these compounds may be used. As a further example, $R_1$ contains from about 18 to about 22 carbon atoms and may contain a carbonyl, an amide, or an amine, and $R_2$, $R_3$, and $R_4$ are the same as one another and have from 1 to about 3 carbon atoms.

In another embodiment, the viscoelastic surfactant system further may contain an amine, for example having the structure:

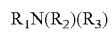

in which $R_1$, $R_2$, and $R_3$ are as defined above. The amine may be present at a concentration of between about 0.01 and about 1 percent. $R_1$, $R_2$, and $R_3$ may be identical in the cationic surfactant and the amine. In another embodiment, the cationic surfactant system may contain a polysulfonic acid.

Another example of a suitable cationic viscoelastic surfactant is one in which $R_1$ is a group having from about 18 to about 22 carbon atoms, that may include a carbonyl, an amide, or an amine, and in which $R_2$, $R_3$, and $R_4$ have from 1 to about 3 carbon atoms and may be substituted with a group that renders the $R_2$, $R_3$, and $R_4$ group more hydrophilic. An example of a suitable cationic viscoelastic surfactant of this embodiment is erucyl bis(2-hydroxyethyl) methyl ammonium chloride.

In yet another embodiment, the viscoelastic surfactant system includes a zwitterionic surfactant, for example a surfactant having the structure:

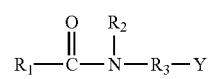

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment, the zwitterionic surfactant has the betaine structure:

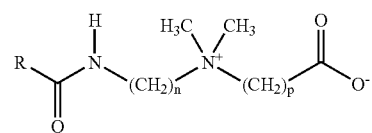

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may be used. Exemplary embodiments of such betaines include those in which R is $C_{17}H_{33}$ or $C_{21}H_{41}$, and n=3 and p=1.

DETAILED DESCRIPTION OF THE EMBODIMENTS OF THE INVENTION

Figure 1:
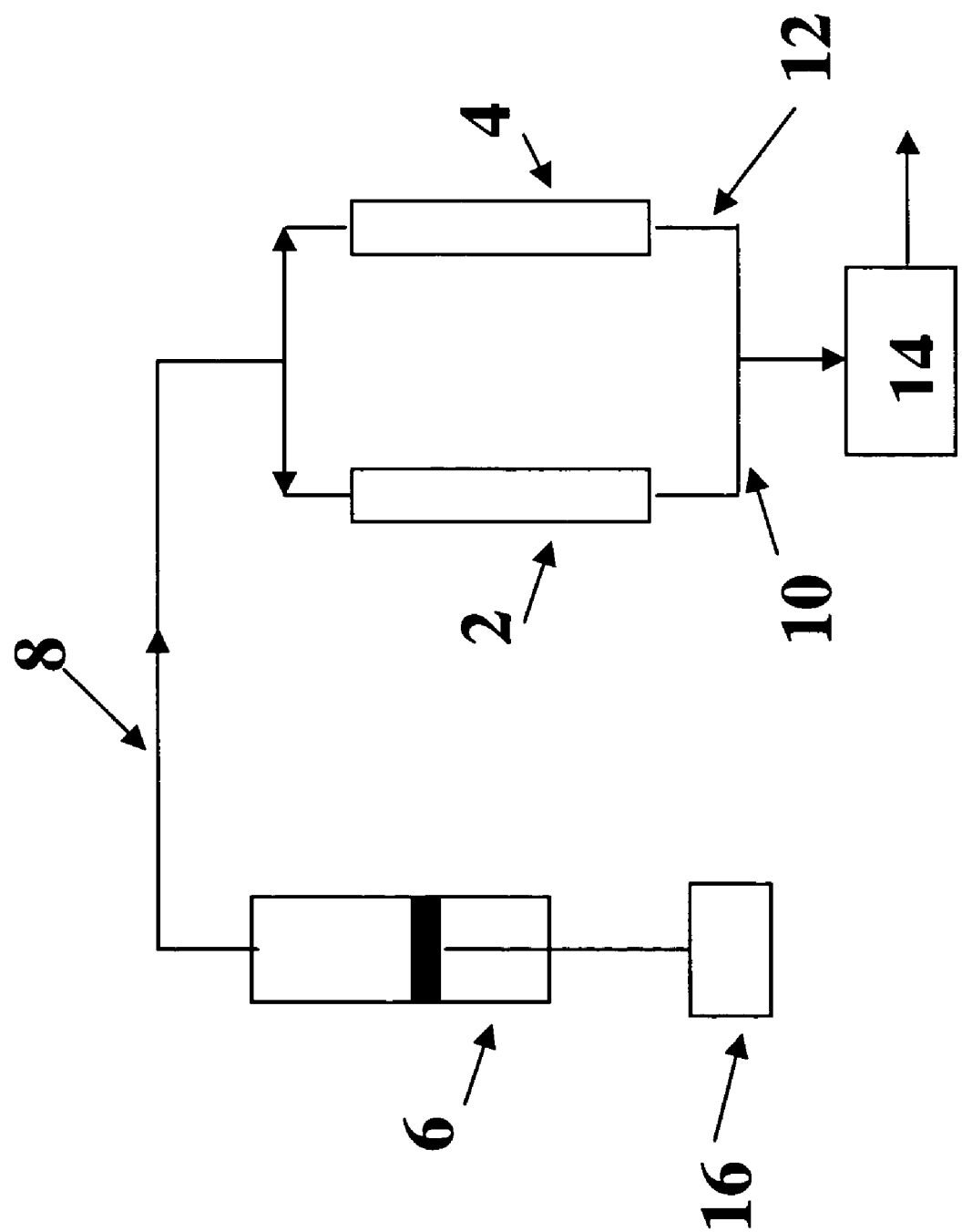
FIG. 1 shows a schematic of the apparatus used for the experiments.

Acid stimulation is a technique widely used to increase production of oil and gas from carbonate reservoirs. The injected acid dissolves the minerals in the formation and creates conductive flow channels known as wormholes that facilitate production. When reservoirs with different zones of permeability are treated with acid, the acid flows into the high permeability zones and does not stimulate the low permeability zones. To stimulate the low permeability zones, it is necessary to divert the acid from high to low permeability zones. Similarly, when long enough intervals are treated with acid, diversion is needed to prevent a heterogeneous injection profile from resulting. One of the methods used to divert acid involves mixing a viscoelastic surfactant with the acid prior to injection of the acid into the formation. (A "viscoelastic" surfactant is a surfactant that under certain conditions can impart viscoelasticity to a fluid.) The viscosity of certain mixtures of acid and VES depends on the concentration of acid; the viscosity of the mixture is low when it is strongly acidic and the viscosity increases as the acid spends in the formation. This increase in viscosity causes increased resistance to flow in the high permeability zone, leading to a build-up of pressure that helps in diverting the flow to lower permeability zones. In this use, such fluids are called viscoelastic diverting acids, or VDA's. Similarly, in acid fracturing, most often the method of treating sandstones with acid, the growing fracture may encounter or create high-permeability regions through which acid, which is incorporated in the fluid so that it can etch the fracture faces, leaks off into the formation. Avoiding, or at least minimizing, this loss of acid is called leakoff control. At best, this is inefficient and wasteful of acid; at worst, this may reduce or eliminate fracture growth. The same compositions and methods that are used for diversion in matrix treatments may be used for leakoff control in fracturing treatments.

It should be understood that any fluid that dissolves at least portions of a given formation may be used to stimulate or fracture the formation. Normally acids are used and the treatments are called acidizing or acid fracturing. However, other formation-dissolving agents may be used, for example chelating agents for the appropriate minerals, for example aminopolycarboxylic acids or polyaminopolycarboxylic acids. Except when we name specific acids, we intend the term "acid" to include other formation-dissolving agents.

We have found that certain viscoelastic surfactant fluid systems may be used at initial surfactant concentrations much lower than would previously have been thought possible. We define the "initial" concentration or the "initial" fluid as the concentration or fluid that is pumped into the wellbore. Unless otherwise stated, all percentage concentrations presented herein are by weight. Not to be limited by theory, but it is believed that at the concentrations used in the initial fluids, the surfactant system is unable to form a three dimensional structure that increases the viscosity of the fluid. The viscoelastic surfactant in the initial fluid may or may not form micelles; if micelles are formed, they are not of the proper size, shape, or concentration to create viscosifying structure, and so the initial fluid has an essentially water-like viscosity. However, as the fluid flows through the formation, the concentration of surfactant in the fluid at some location, for example at or near a wormhole tip, increases, due to interactions between the formation and the fluid and its components. As the localized surfactant concentration increases, micelles are formed, or micelle shape or size or concentration increases, and the fluid viscosity increases due to aggregation of viscoelastic surfactant structures. Still not to be limited by theory, but formation of carbon dioxide by the dissolution of formation carbonate may be a factor in the viscosity increase. When we refer here to "viscous", or "viscoelastic", or "gelled" fluids, we mean fluids in which viscoelastic surfactant structures have aggregated. Initial fluids generally have viscosities below about 20 cP; gelled fluids generally have viscosities above about 50 cP. Thus, injection of an initial fluid that is not viscous because it contains a viscoelastic surfactant concentration too low to contribute to the initial viscosity of the fluid may nonetheless be used to treat a formation with a viscous fluid. In matrix treatments, for example, this initial fluid system forms wormholes and then gels at or near the tip of the wormhole, causing diversion. In acid fracturing, for example, this initial fluid gels where leakoff is high, and so this fluid system controls leakoff.

Many viscoelastic surfactants may be used this way, but certain cationic surfactants are preferred. Exemplary cationic viscoelastic surfactants include the amine salts and quaternary amine salts disclosed in U.S. Pat. Nos. 5,979, 557, and 6,435,277 which have a common Assignee as the present application and which are hereby incorporated by reference.

Examples of suitable cationic viscoelastic surfactants include cationic surfactants having the structure:

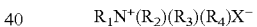

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl)methyl ammonium chloride, ("EMHAC"), also known as (Z)-13 docosenyl-N-N-bis(2-hydroxyethyl)methyl ammonium chloride. It is commonly obtained from manufacturers as a mixture containing about 60 weight percent surfactant in a mixture of isopropanol, ethylene glycol and water. In this patent, when we refer to "EMHAC" we mean such a solution. Other suitable amine salts and quaternary amine salts include (either alone or in combination in accordance with the invention), erucyl trimethyl ammonium chloride; N-methyl-N,N-bis(2-hydroxyethyl)rapeseed ammonium chloride; oleyl methyl bis(hydroxyethyl)ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris (hydroxyethyl)ammonium bromide; hexadecyl ethyl bis(hydroxyethyl)ammonium chloride; hexadecyl isopropyl bis (hydroxyethyl)ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

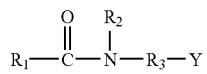

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

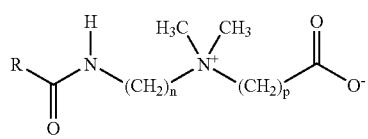

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The VES surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a $C_{21}H_{41}$ alkene tail group) and is supplied as about 40% active ingredient, with the remainder substantially water, sodium chloride, and isopropanol. BET surfactants, and others that are suitable, are described in U.S. Pat. No. 6,703,352.

Certain co-surfactants may be useful in extending the brine tolerance, to increase the gel strength, to reduce the shear rehealing time, and/or to reduce the shear sensitivity of zwitterionic VES fluid systems, such as betaine VES fluids. An example given in U.S. Pat. No. 6,703,352 is sodium dodecylbenzene sulfonate (SDBS). Another example is polynaphthalene sulfonate. Zwitterionic VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate. Many suitable additives are known for improving the performance of gelled VES surfactant systems; any may be used in the current invention; they should be tested for compatibility with the compositions and methods of the invention before use; simple laboratory experiments for such testing are well known.

Zwitterionic surfactant viscoelastic systems typically contain one or more members of the group consisting of organic acids, organic acid salts, inorganic salts, and oligomers, polymers, co-polymers, and mixtures of these members. This member is typically present in only a minor amount and need not be present at all. The organic acid is typically a sulfonic acid or a carboxylic acid and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, hydroxynaphthalene carboxylates, e.g. 5-hydroxy-1-naphthoic acid, 6-hydroxy-1-naphthoic acid, 7-hydroxy-1-naphthoic acid, 1-hydroxy-2-naphthoic acid, preferably 3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof typically aids the development of increased viscosity that is characteristic of preferred fluids. The organic acid or salt thereof is typically present in the zwitterionic viscoelastic fluid (after the viscoelastic surfactant has concentrated sufficiently to viscosify the fluid) at a weight concentration of from about 0.1% to about 10%, more typically from about 0.1% to about 7%, and even more typically from about 0.1% to about 6%.

Inorganic salts that are particularly suitable for use in the zwitterionic viscoelastic fluid include water-soluble potassium, sodium, and ammonium salts, such as potassium chloride and ammonium chloride. Additionally, calcium chloride, calcium bromide and zinc halide salts may also be used. The inorganic salts may aid in the development of increased viscosity which is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight. The inorganic salt is typically present in the zwitterionic viscoelastic fluid (after the viscoelastic surfactant has concentrated sufficiently to viscosify the fluid) at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be used in addition to, or as a replacement for, the inorganic salts. Optionally, these systems may be formed in dense brines, including brines containing polyvalent cations.

As an alternative to the organic salts and inorganic salts, or as a partial substitute therefore, one can use a medium to long chain alcohol (preferably an alkanol), preferably having five to ten carbon atoms, or an alcohol ethoxylate (preferably an alkanol ethoxylate) preferably of a 12 to 16 carbon alcohol and having 1 to 6, preferably 1-4, oxyethylene units.

Amphoteric viscoelastic surfactants are also suitable. Exemplary amphoteric viscoelastic surfactants include those described in U.S. Pat. No. 6,703,352, for example amine oxides. Mixtures of zwitterionic surfactants and amphoteric surfactants are suitable. An example, called BET-E-40/AO here, is a mixture of about 13% isopropanol, about 5% 1-butanol, about 15% ethylene glycol monobutyl ether, about 4% sodium chloride, about 30% water, about 30% cocamidopropyl betaine, and about 2% cocamidopropylamine oxide.

The formation treatment fluid containing a low-concentration VES system typically contains a formation-dissolving agent, for example hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient).

When the fluids described above, having initially low viscoelastic surfactant concentrations, contain formation-dissolving agents, they may be used as the main fluids in matrix treatments, and fracturing treatments. With or without formation-dissolving agents, the fluids may be used as diversion fluids. When used as main fluids or as diversion fluids, injection may be alternated with injection of other fluids, optionally with one stage of each or many stages of each, and the fluids of the invention may optionally be the first fluids injected. For example, injection may be alternated with initially viscous fluids, with (other) diversion fluids, or with (other) main fluids. Optionally other fluids injected may be similar to the fluids of the invention except for the surfactant concentration. Optionally, the fluids may contain fibers, may contain other particulate material such as fluid loss additives, and may be foamed or energized.

The extent to which the surfactant is concentrated within the formation during the matrix treatment, fracturing treatment, or diversion treatment depends upon the properties of the formation, for example the temperature, chemical composition and pore structure, and the fluid composition, for example the nature of the surfactant and the nature and concentration of other components, for example salts and formation-dissolving agents. The concentration of viscoelastic surfactant in the initial fluid depends upon the volume of formation to be treated, the volume of initial fluid to be injected, the extent to which the surfactant is concentrated during the treatment, and the concentration needed to viscosify the fluid. The initial viscoelastic surfactant concentration is generally from about 0.1% to about 10%, for example from about 0.25% to about 1%. It should be understood that an initial concentration of a given viscoelastic surfactant might be insufficient to allow aggregation of that viscoelastic surfactant in that fluid while the same concentration of another surfactant, or of that surfactant in another fluid or under other conditions, might be sufficient for aggregation. Therefore, the appropriate concentration in the present invention is the same as, or even more than, the concentration of the same or a different surfactant reportedly used under other conditions as a viscoelastic surfactant. The underlying concept is that the initial concentration used in the method of the present invention is insufficient, under the initial conditions of use, to form viscosifying aggregates.

Matrix acidizing and acid fracturing are typically undertaken to provide improved flow paths for the production of hydrocarbons, but the method is equally useful in wells for the production of other fluids (such as water or helium) or for injection wells (for example for enhanced oil recovery or for disposal).

EXAMPLES

The VES/acid systems were tested for diverting capability using a dual core apparatus. A schematic of the apparatus used is shown in FIG. 1. The apparatus consists of two cores [2] and [4] in holders, a high permeability core and a low permeability core. The two cores were connected to an accumulator [6] containing acid that was displaced by a piston into a single fluid line [8] connected to the two core holders. The exit fluid lines of the core holders, [10] and [12], were connected to a backpressure regulator [14] that was maintained at 1200 psi (8.27 MPa). Acid was injected into the cores at a constant injection rate (2.5 ml/mn for most cases) until it broke through one of the cores. Unless stated otherwise, the acid always broke through the high permeability core. The effectiveness of the acid in diverting the fluid to the low permeability zone was determined by measuring the length of the wormhole formed in the low permeability core. Laboratory tests were conducted using this dual core apparatus with pairs of cores having different permeability contrasts.

The data obtained are reported in Tables 1 and 2. In the tables, the surfactants EMHAC, and BET-E-40 were as received materials as described above. Cat A, Cat B, and Cat C, were three cationic surfactant formulations containing the same cationic surfactant $R_1N^+(R_2)(R_3)(R_4)X^-$ (in which $R_1$ has from about 18 to about 22 carbon atoms and contains an amide; $R_2$, $R_3$, and $R_4$ are the same short-chained saturated alkyl group, and $X^-$ is a halide). Cat A, Cat B, and Cat C, contain differing choices and amounts of the types of additives commonly obtained in commercially available as-received surfactant concentrates. Corrosion inhibitor A was a mixture of about 10% formic acid, about 25% isopropanol, about 35% cinnamaldehyde, about 15% benzyl quinolinium chloride, and about 15% of a mixture of ethoxylated $C_{11}$ linear and branched alcohols. Corrosion inhibitor B was a mixture of about 25% formic acid, about 10% of a mixture of methanol and isopropanol, about 8% water, about 25% naphthyl methyl quinolinium chloride, about 10% ethoxylated tridecyl alcohol, about 8% 3-methoxy-2-benzoyl-1-propene, and about 1% to about 3% each of a number of other amines, acids, alcohols, ketones and ethers. Corrosion inhibitor C was a mixture of about 35% methanol, about 5% propargyl alcohol, and about 60% of a proprietary organic mixture. Corrosion inhibitor D was 85% formic acid in water.

In the Tables, K is the core permeability, Q is the flow rate, the temperatures are in degrees Centigrade, and the core lengths are shown in cm. The column labeled "Wormhole" shows the penetration of the fluid into the lower permeability core when the fluid broke through the higher permeability core.

Table 1 shows the results with 0.5% CAT A in 15% HCl, a concentration at which the CAT A does not gel in this fluid system. It can be seen that in relatively low permeability cores, there was clearly diversion of flow from the higher permeability core to the lower permeability core in each experiment, because there was substantial penetration of fluid into the lower permeability core before the fluid broke through in the higher permeability core. In the medium permeability experiments, the effect was even greater; in most cases, penetration into the lower permeability core was almost as great as into the higher permeability core. In the one experiment with high permeability cores, the diversion was excellent; in fact, breakthrough occurred first in the lower permeability core.

Table 2 shows results with various other fluids. (Except for the one experiment for which an HCl concentration of 20% is shown, all the initial fluids in the experiments of Table 2 contained 15% HCl.) Although criteria vary, the first and fourth experiments in Table 2 would have been considered by most people skilled in the art to have been gelled as pumped. It can be seen that Cat A, Cat B, and Cat C were all effective. It can also be seen that a mixture of a zwitterionic surfactant and an amphoteric surfactant (BET-E-40/AO) was effective.

The fluids designated "2PV SDA" and "1PV SDA" represent passing two pore volumes and one pore volume, respectively, of a self-diverting polymer-based acid ("SDA") through the dual-core system. The SDA system was made by mixing 3% of an approximately 35% cationic polyacrylamide solution, 5% HCl, 1% of an about 33% hydrazinium chloride solution, 0.5% of about 40% ferric chloride, 0.4% of a corrosion inhibitor, and 1% of 85% formic acid. (The hydrazinium chloride reduces the ferric ion to ferrous ion, that crosslinks the polymer, only after the fluid pH increases above about 2 as the acid is spent; when the pH goes above about 3.5 the crosslinking is reversed.) After the injection of the SDA, the cores were flushed with 15% HCl containing 0.4% corrosion inhibitor A. Although there was diversion, the SDA was not as effective as many of the embodiments of the present invention. Also, not shown is that measurement of the pressure drops across the cores (with 2% KCl) after the treatments showed that the permeabilities after treatment with suitable surfactant systems of the invention were always grater than the permeabilities after treatment with SDA. The polymer-based SDA damaged the cores; the surfactant-based systems did not.

In a separate experiment, not shown, when an HCl solution containing no surfactant was injected into three cores in parallel, all of the HCl solution entered the highest permeability core.

TABLE 1

0.5% Cat A + 15% HCl

| Temp | K1 (mD) | K2 (mD) | K1/K2 | Q (ml/min) | CoreLength | Corro. Inhib. | Wormhole |
|---|---|---|---|---|---|---|---|
| Low Permeability | | | | | | | |
| 93.3 | 30 | 2.6 | 12 | 1 | 30.5 | 0.4% A | Conical-50% each |
| 93.3 | 17 | 1.6 | 11 | 2.5 | 30.5 | 0.4% A | 60% |
| 93.3 | 22 | 1.2 | 18 | 2.5 | 15.2 | 0.4% A | 50% |
| 121.1 | 40 | 1 | 40 | 2.5 | 15.2 | 0.4% A | 10% |
| 93.3 | 30 | 2 | 15 | 2.5 | 30.5 | 0.4% B | 8% |
| 93.3 | 15 | 2.2 | 7 | 2.5 | 30.5 | 0.4% C | 50% |
| Medium Permeability | | | | | | | |
| 93.3 | 50 | 24 | 2 | 2.5 | 15.2 | 0.4% A | 75% |
| 93.3 | 45 | 6.3 | 7 | 2.5 | 30.5 | 0.4% A | 30% |
| 121.1 | 17 | 12 | 1 | 2.5 | 30.5 | 0.4% A | 83% |
| 121.1 | 96 | 10 | 10 | 2.5 | 30.5 | 0.4% A | 83% |
| High Permeability | | | | | | | |
| 121.1 | 260 | 173 | 2 | 2.5 | 15.2 | 0.4% A | Breakthrough in core 2; core 1 75% |

TABLE 2

| Fluid | Temp | K1 (mD) | K2 (mD) | K1/K2 | Q (ml/mn) | Core Length | Worm-hole |
|---|---|---|---|---|---|---|---|
| 5% BET-E-40 + 0.3% B + 1% MeOH | 93.3 | 25 | 1 | 25 | 1 | 30.5 | 25% |
| 1% BET-E-40 + 0.3% B + 1% MeOH | 93.3 | 28 | 2.3 | 12 | 2.5 | 30.5 | 8% |
| 2% BET-E-40 + 0.5% Cat A + 0.4% A + 1% MeOH | 93.3 | 25 | 2 | 13 | 2.5 | 30.5 | 8% |
| 2% BET-E-40 + 0.5% Cat A + 0.4% A | 93.3 | 34 | 2 | 17 | 2.5 | 30.5 | 33% |
| 0.75% BET-E-40 + 0.3% B + 1% MeOH | 93.3 | 45 | 2 | 23 | 2.5 | 30.5 | 8% |
| 0.5% EMHAC + 20% HCl + 0.3% B + 1% D | 93.3 | 48 | 7 | 7 | 2.5 | 30.5 | 12% |
| 0.5% Cat B + 0.3% A | 93.3 | 144 | 68 | 2 | 2.5 | 30.5 | 83% |
| 2 PV SDA + 0.4% A | 93.3 | 152 | 8 | 19 | 2.5 | 30.5 | 17% |
| 1 PV SDA + 0.4% A | 93.3 | 118 | 16 | 7 | 2.5 | 30.5 | 17% |
| 0.5% BET-E-40/AO + 0.4% A | 93.3 | 141 | 17 | 8 | 2.5 | 30.5 | 67% |
| 0.5% Cat C + 0.3% A | 93.3 | 64 | 17 | 4 | 2.5 | 30.5 | 100% |

What is claimed is:

1. A method of treating a subterranean formation penetrated by a wellbore comprising injecting into said formation a treatment fluid comprising at least one viscoelastic surfactant at a concentration of between about 0.1 and about 10 percent by weight, a viscoelastic surfactant concentration insufficient for aggregation of viscoelastic surfactant structures to form a viscoelastic fluid, wherein said treatment fluid further comprises a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts thereof and mixtures of said acids and salts.

2. The method of claim 1 wherein the concentration of said viscoelastic surfactant is between about 0.25 and about 1 percent by weight.

3. The method of claim 1 wherein said treatment fluid is a matrix acidizing fluid.

4. The method of claim 1 wherein said treatment fluid is an acid fracturing fluid.

5. The method of claim 1 wherein said treatment fluid is a diversion fluid.

6. The method of claim 1 wherein said viscoelastic surfactant comprises a cationic surfactant.

7. The method of claim 6 wherein said cationic surfactant comprises a cationic surfactant having the structure:

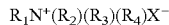

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion; and mixtures of these compounds.

8. The method of claim 7 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide.

9. The method of claim 8 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

10. The method of claim 7 wherein $R_1$ comprises from about 18 to about 22 carbon atoms, and may comprise a carbonyl, an amide, or an amine, and $R_2$, $R_3$, and $R_4$ comprise from 1 to about 3 carbon atoms and may be substituted with a group that renders the $R_2$, $R_3$, and $R_4$ group more hydrophilic.

11. The method of claim 10 wherein said cationic surfactant is erucyl bis(2-hydroxyethyl) methyl ammonium chloride.

12. The method of claim 6 wherein said visco elastic surfactant further comprises an amine.

13. The method of claim 12 wherein said amine has the structure:

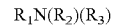

and $R_1$, $R_2$, and $R_3$ are as defined in claim 7.

14. The method of claim 6 wherein said viscoelastic surfactant further comprises a polysulfonic acid.

15. The method of claim 1 wherein said viscoelastic surfactant comprises a zwitterionic surfactant.

16. The method of claim 15 wherein said zwitterionic surfactant comprises a zwitterionic surfactant having the structure:

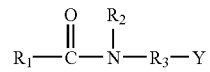

wherein $R_1$ is a hydrocarbyl group that may be branched or straight chained, aromatic, aliphatic or olefinic and comprises from about 14 to about 26 carbon atoms and may comprise an amine; $R_2$ is hydrogen or an alkyl group having from 1 to about 4 carbon atoms; $R_3$ is a hydrocarbyl group having from 1 to about 5 carbon atoms; and Y is an electron withdrawing group.

17. The method of claim 16 wherein said zwitterionic surfactant has the structure:

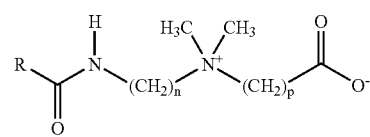

wherein R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds.

18. The method of claim 17 wherein R is $C_{17}H_{33}$, and $n=3$ and $p=1$.

19. The method of claim 17 wherein R is $C_{21}H_{41}$, and $n=3$ and $p=1$.

20. The method of claim 1 wherein said viscoelastic surfactant comprises an amphoteric surfactant.

21. The method of claim 20 wherein said amphoteric surfactant is an amine oxide.

22. The method of claim 1 wherein said viscoelastic surfactant comprises a zwitterionic surfactant and a cationic surfactant.

23. The method of claim 1 wherein said viscoelastic surfactant comprises a zwitterionic surfactant and an amphoteric surfactant.

24. The method of claim 1 wherein said at least one viscoelastic surfactant is selected from the group consisting of one or more cationic viscoelastic surfactants, one or more zwitterionic viscoelastic surfactants, one or more amphoteric viscoelastic surfactants, and mixtures thereof.

25. A method of matrix acidizing a subterranean formation penetrated by a wellbore comprising injecting into said formation a treatment fluid comprising at least one viscoelastic surfactant at a viscoelastic surfactant concentration of between about 0.1% and about 10% by weight that is insufficient for aggregation of viscoelastic surfactant structures to form a visco elastic fluid wherein said treatment fluid further comprises a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts of these acids and mixtures of these acids and salts.

26. The method of claim 25 wherein said visco elastic surfactant comprises a cationic surfactant.

27. The method of claim 26 wherein said viscoelastic surfactant further comprises an amine.

28. The method of claim 26 wherein said viscoelastic surfactant further comprises a polysulfonic acid.

29. A method of acid fracturing a subterranean formation penetrated by a wellbore comprising injecting into said formation a treatment fluid comprising at least one viscoelastic surfactant at a viscoelastic surfactant concentration of between about 0.1% and about 10 by weight that is insufficient for aggregation of viscoelastic surfactant structures to form a visco elastic fluid wherein said treatment fluid further comprises a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts of these acids and mixtures of these acids and salts.

30. The method of claim 29 wherein said viscoelastic surfactant comprises a cationic surfactant.

31. The method of claim 30 wherein said viscoelastic surfactant further comprises an amine.

32. The method of claim 30 wherein said viscoelastic surfactant further comprises a polysulfonic acid.

33. A method of diverting a fluid injected into a subterranean formation penetrated by a wellbore comprising injecting into said formation a treatment fluid comprising at least one viscoelastic surfactant at a viscoelastic surfactant concentration of between about 0.1% and about 10 by weight that is insufficient for aggregation of viscoelastic surfactant structures to form a viscoelastic fluid, wherein said treatment fluid further comprises a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts of these acids and mixtures of these acids and salts.

34. The method of claim 33 wherein said viscoelastic surfactant comprises a cationic surfactant.

35. The method of claim 34 wherein said viscoelastic surfactant further comprises an amine.

36. The method of claim 34 wherein said viscoelastic surfactant further comprises a polysulfonic acid.

* * * * *